United States Patent
Middleton, Jr. et al.

(10) Patent No.: US 9,464,559 B2
(45) Date of Patent: Oct. 11, 2016

(54) PASSIVE EXHAUST VALVE ASSEMBLY AND FORMING METHOD

(71) Applicant: Middleville Tool & Die Co., Middleville, MI (US)

(72) Inventors: Robert Leroy Middleton, Jr., Middleville, MI (US); Justin Tyler Middleton, Middleville, MI (US)

(73) Assignee: MIDDLEVILLE TOOL & DIE CO., Middleville, MI (US)

(*) Notice: Subject to any disclaimer, the term of this patent is extended or adjusted under 35 U.S.C. 154(b) by 0 days.

(21) Appl. No.: 15/015,299

(22) Filed: Feb. 4, 2016

(65) Prior Publication Data

US 2016/0222863 A1 Aug. 4, 2016

Related U.S. Application Data

(60) Provisional application No. 62/111,696, filed on Feb. 4, 2015.

(51) Int. Cl.
*F01N 13/08* (2010.01)
*F01N 1/16* (2006.01)
(Continued)

(52) U.S. Cl.
CPC ............... *F01N 13/08* (2013.01); *F01N 1/165* (2013.01); *F16K 1/22* (2013.01); *F16K 15/033* (2013.01); *Y10T 137/7876* (2015.04); *Y10T 137/7898* (2015.04)

(58) Field of Classification Search
CPC .......... F16K 1/22; F01N 13/08; F01N 1/165; Y10T 137/7876; Y10T 137/79; Y10T 137/7901; Y10T 137/7898
USPC ................. 251/286, 288, 303, 304, 305, 313
See application file for complete search history.

(56) References Cited

U.S. PATENT DOCUMENTS

| 399,390 A | | 3/1889 | Eareckson | |
|---|---|---|---|---|
| 1,242,621 A | * | 10/1917 | Watkins | F16K 1/22 251/305 |
| 1,422,466 A | * | 7/1922 | Morse | F16K 1/22 251/146 |

(Continued)

FOREIGN PATENT DOCUMENTS

GB 187916 11/1922

OTHER PUBLICATIONS

Robert Leroy Middleton Jr., Justin Tyler Middleton, and Robert Leroy Middleton Sr., Passive Exhaust Valve with Floating Spring Stop, U.S. Appl. No. 15/045,565, filed Feb. 17, 2016.

(Continued)

*Primary Examiner* — Craig Schneider
*Assistant Examiner* — Frederick D Soski
(74) *Attorney, Agent, or Firm* — Gardner, Linn, Burkhart & Flory, LLP (57) ABSTRACT

A passive valve assembly for an engine exhaust system includes an exhaust conduit for transferring exhaust gases from the engine and a valve plate that is operably disposed within the exhaust conduit. A pivot rod has an internal section that is coupled with the valve plate, such that the valve plate may pivot between an open position and a closed position. The pivot rod also has an external section that protrudes from the exhaust conduit. A stop feature is disposed at or near an exterior surface of the exhaust conduit in a location arranged to contact the external section of the pivot rod and prevent the valve plate from pivoting beyond one of the open position and the closed position.

28 Claims, 8 Drawing Sheets

(51) Int. Cl.
*F16K 1/22* (2006.01)
*F16K 15/03* (2006.01)

(56) References Cited

U.S. PATENT DOCUMENTS

| | | | | |
|---|---|---|---|---|
| 1,447,380 | A | * | 3/1923 | Goetz ........................ F16K 1/22 |
| | | | | 181/236 |
| 1,613,322 | A | * | 1/1927 | Goetz .................... F01N 1/084 |
| | | | | 137/522 |
| 1,672,266 | A | * | 6/1928 | Linendoll ................ F16K 1/22 |
| | | | | 137/627 |
| 2,936,778 | A | * | 5/1960 | Stillwagon ................ F16K 1/22 |
| | | | | 137/454.6 |
| 3,234,924 | A | * | 2/1966 | May .......................... F02D 9/04 |
| | | | | 123/323 |
| 4,682,674 | A | | 7/1987 | Schmidt |
| 4,699,244 | A | * | 10/1987 | Bergquist ................ F01N 1/165 |
| | | | | 181/226 |
| 5,046,408 | A | | 9/1991 | Eugenio |
| 5,305,787 | A | * | 4/1994 | Thygesen ............. F16K 15/033 |
| | | | | 137/527 |
| 5,355,673 | A | * | 10/1994 | Sterling ................ F01N 13/082 |
| | | | | 137/527 |
| 6,338,246 | B2 | | 1/2002 | Eguchi et al. |
| 6,739,579 | B1 | | 5/2004 | Rim |
| 7,434,570 | B2 | | 10/2008 | Hill |
| 7,628,250 | B2 | | 12/2009 | Abram et al. |
| 7,775,322 | B2 | | 8/2010 | Hill |
| 7,896,130 | B2 | | 3/2011 | Hill et al. |
| 8,191,572 | B2 | | 6/2012 | Lefler et al. |
| 8,201,401 | B2 | | 6/2012 | Abram et al. |
| 8,215,103 | B2 | | 7/2012 | Hill |
| 8,381,401 | B2 | | 2/2013 | Sahs et al. |
| 8,468,813 | B2 | | 6/2013 | Hill et al. |
| 8,657,065 | B1 | | 2/2014 | Hill |
| 8,776,508 | B2 | | 7/2014 | Abram et al. |
| 8,950,731 | B2 | | 2/2015 | Ishihata et al. |
| 2006/0260868 | A1 | | 11/2006 | Suzuki et al. |
| 2007/0283680 | A1 | * | 12/2007 | Willats .................... F01N 1/023 |
| | | | | 60/273 |
| 2008/0083218 | A1 | | 4/2008 | Abram et al. |
| 2008/0115494 | A1 | * | 5/2008 | Willats .................... F01N 13/08 |
| | | | | 60/686 |
| 2009/0126358 | A1 | | 5/2009 | Abram et al. |
| 2009/0126359 | A1 | | 5/2009 | Abram et al. |
| 2010/0263211 | A1 | | 10/2010 | Sahs et al. |
| 2013/0233269 | A1 | | 9/2013 | Houtschilt et al. |
| 2013/0299004 | A1 | | 11/2013 | Abram |
| 2015/0027566 | A1 | | 1/2015 | Kobori |

OTHER PUBLICATIONS

International Search Report and Written Opinion dated Apr. 14, 2016 from corresponding PCT Application No. PCT/US2016/016502.

* cited by examiner

PASSIVE EXHAUST VALVE ASSEMBLY AND FORMING METHOD

CROSS-REFERENCE TO RELATED APPLICATIONS

The present application claims benefit under 35 U.S.C. §119(e) of U.S. Provisional Application Ser. No. 62/111,696, entitled PASSIVE EXHAUST VALVE ASSEMBLY AND FORMING METHOD, filed Feb. 4, 2015, which is hereby incorporated herein by reference in its entirety.

FIELD OF THE INVENTION

The present invention relates generally to the field of passive exhaust valves, and more particularly to components and features that assist in moving and biasing a vane or valve plate of a passive valve assembly in an exhaust conduit and corresponding methods of forming and installing such a valve assembly in an exhaust conduit.

BACKGROUND OF THE INVENTION

To control back flow pressure and reduce low frequency engine noise in exhaust systems of combustion engines, it is generally understood that a passive valve may be provided in the exhaust line to alter characteristics of exhaust flow by actuating in response to changes in exhaust pressure. Passive valves may regulate exhaust pressure and attenuate exhaust system noise; however, in some instances they can also create undesired noises, such as noises of a valve plate closing against an interior surface of a valve conduit, and squeaking or fluttering noises of the valve plate moving between open and closed positions, for example when experiencing exhaust pressure fluctuations or pulses. In addition to providing undesirable acoustics for the exhaust system, these noises may cause pre-mature wear and damage to the valve and other negative consequences to performance of the exhaust system. Further, passive valve assemblies can be difficult to install and assemble in a cost effective manner.

SUMMARY OF THE PRESENT INVENTION

The present invention provides an exhaust conduit or pipe section that includes a valve plate or vane member that can pivot within the interior volume or flow path of the exhaust conduit to regulate the flow of exhaust gases through the exhaust conduit, such that noises that can be generated by movement of the valve plate may be reduced or eliminated. In accordance with one aspect of the present invention, a passive exhaust valve includes a conduit for transporting exhaust gases and a pivot rod that extends through a wall of the conduit to define a internal section and an external section of the pivot rod. A valve plate is disposed in the conduit and is coupled with the internal section of the pivot rod, whereby the pivot rod is rotatable to move the valve plate between open and closed positions. A stop feature is coupled with the conduit and arranged to contact the external section of the pivot rod when the valve plate pivots toward at least one of the open and closed positions to prevent further rotation of the pivot rod beyond the respective open or closed position.

In accordance with another aspect of the present invention, a passive valve assembly for an engine exhaust system includes an exhaust conduit for transferring exhaust gases from the engine and a valve plate that is operably disposed within the exhaust conduit and is pivotable between an open position and a closed position. A pivot rod has an internal section that is coupled with the valve plate and has an external section that protrudes from the exhaust conduit. A stop feature is disposed at or near an exterior surface of the exhaust conduit in a location arranged to contact the external section of the pivot rod and prevent the valve plate from pivoting beyond one of the open position and the closed position.

Optionally, a cover member may be coupled with the conduit or exhaust conduit to substantially conceal an aperture in the wall or sidewall of the conduit at or near the intersection with the pivot rod. The cover member may have a curved shape that substantially aligns with a curvature of the conduit. Also, the stop feature may optionally be an integral portion or piece of the cover member.

In accordance with yet another aspect of the present invention, a method of forming a passive exhaust valve includes providing a tubular conduit having an aperture in a sidewall of the tubular conduit. A valve plate is inserted through the aperture into the tubular conduit and a pivot rod engages at opposing sides of the tubular conduit, where an intermediate section of the pivot rod is coupled with the valve plate for rotation of the pivot rod to move the valve plate between open and closed positions. A cover member is attached about the aperture to substantially conceal the aperture.

In accordance with yet another aspect of the present invention, a method of forming a passive exhaust valve includes providing a first circumferential portion of a tubular conduit having a saddle area disposed on at least one lateral edge of the first circumferential portion. A pivot rod is engaged at the saddle area to locate a valve plate in an interior of the tubular conduit. The valve plate is coupled or preassembled with an internal section of the pivot rod, such that rotation of the pivot rod moves the valve plate between open and closed positions. A second circumferential portion is aligned with the lateral edges of the first circumferential portion to form the tubular conduit around the valve plate, and then the first and second circumferential portions are welded together.

These and other objects, advantages, purposes and features of the present invention will become apparent upon review of the following specification in conjunction with the drawings.

DETAILED DESCRIPTION OF EMBODIMENTS

Referring to the drawings and the illustrative embodiments depicted therein, reference numeral 10 generally designates a passive valve assembly that includes an exhaust conduit 12 for transporting exhaust gases. A valve plate 14 is operably coupled within an internal volume of the exhaust conduit 12 and is configured to pivot between an open position 16 and a closed position 18 that reduces flow of the exhaust gases through the exhaust conduit 12. A pivot rod 20 has a first section 22 coupled with the valve plate 14 and a second section 24 external to the exhaust conduit 12 and angled relative to the first section 22. A stop feature 26 is coupled with the exhaust conduit 12 proximate the pivot rod 20 and has a protrusion 28 that abuts the second section 24 of the pivot rod 20 with the valve plate 14 in the open position 16 and/or the closed position 18. The stop feature 26 is configured to reduce noise by preventing impact of the valve plate 14 against an interior surface of the exhaust conduit 12.

Figure 1:
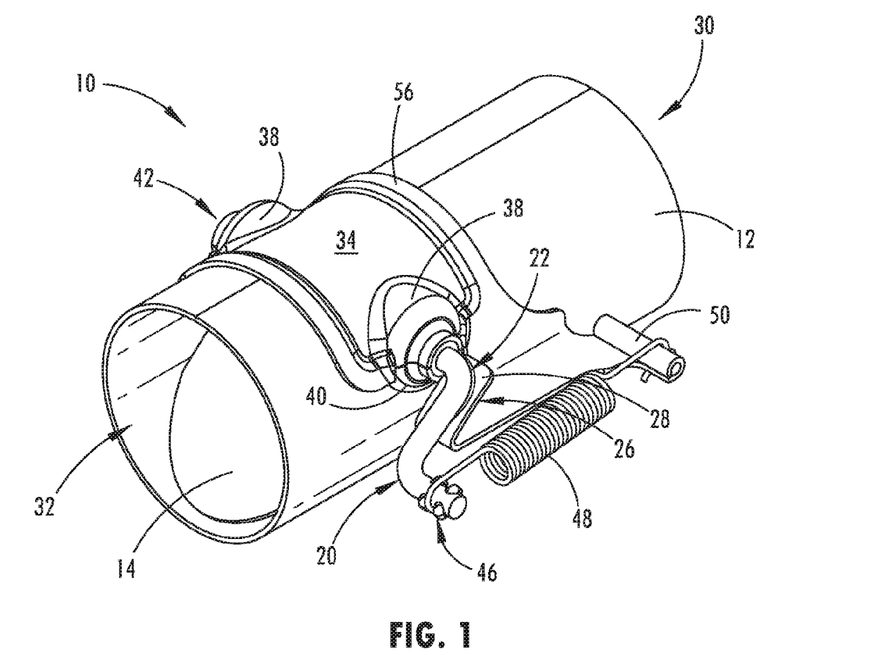
FIG. 1 is an upper perspective view of a passive exhaust valve assembly, according to one embodiment of the present invention.
Figure 2:
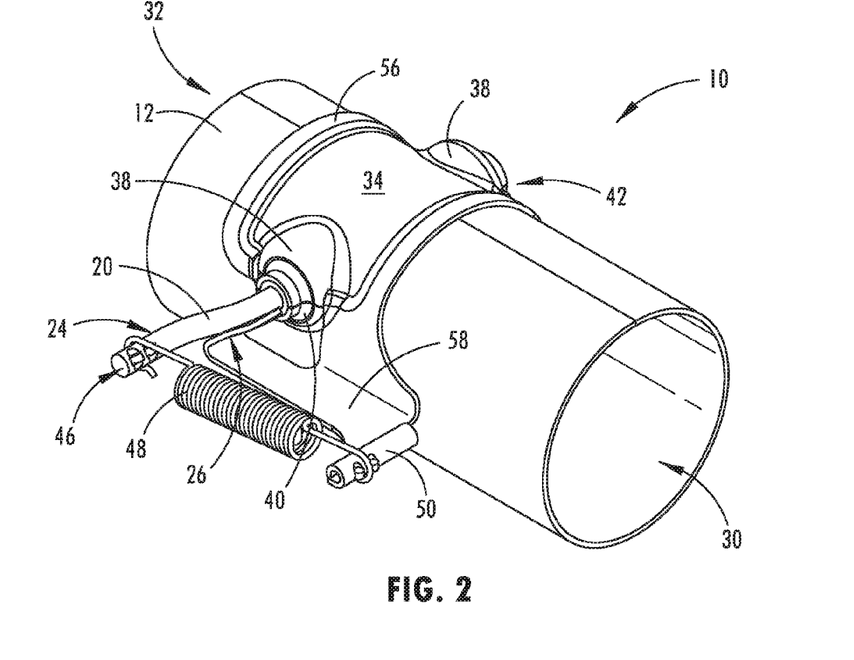
FIG. 2 is another upper perspective view of the exhaust valve assembly shown in FIG. 1, taken from an opposite end from that shown in FIG. 1.

With reference to FIGS. 1 and 2, the exhaust conduit 12 of the passive exhaust valve assembly 10 includes a tubular shape having an inlet end 30 and an outlet end 32 on opposing ends of the exhaust conduit 12 to respectively receive and transfer exhaust gases longitudinally though the exhaust conduit 12. A conduit axis of the exhaust conduit 12 extends centrally through the internal volume of the exhaust conduit 12 between the inlet and outlet ends 30, 32. The valve plate 14 is positioned within the internal volume and is pivotal between the open position 16 and the closed position 18 for preventing exhaust gases from transferring through the tubular conduit. Although shown as a tubular shape, it is conceivable that the exhaust conduit 12 in additional embodiments may have a different cross-sectional shape and may not be linear in the longitudinal direction.

As further illustrated in FIGS. 1 and 2, an upper portion of the tubular conduit includes a cover member 34, which may also be referred to as a hood piece, which is attached around an aperture 36 in a sidewall of the exhaust conduit 12. The cover member 34 substantially conceals the aperture and has a curved shape between opposing lateral sides of the cover member 34 that substantially aligns with a curvature of the tubular conduit. It is, however, contemplated that the upper section or circumferential portion of the tubular conduit may be removed or omitted to form an aperture that spans the length of the conduit, such that the cover member would fill the open circumferential portion to enclose or surround the assembled valve plate.

The opposing lateral sides of the cover member 34 in the illustrated embodiment are provided with upper embossed indentations 38 or saddle areas, such as shown in FIG. 1, with a rounded interior surface configured to contain and support the pivot rod 20. The upper embossed indentations 38 on the cover member 34 are aligned and mated with corresponding lower embossed indentations 40 or saddle areas on the sidewall of the exhaust conduit 12, formed on edges of the aperture 36. The upper and lower embossed indentations 38, 40 together form a pair of axle supports 42 on opposing sides of the exhaust conduit 12 for supporting and rotatably engaging the pivot rod 20. In the illustrated embodiment, the axle supports 42 may include bushings 44 that engage directly between the pivot rod 20 and the upper and lower embossed indentations 38, 40 for reducing friction and noise from the rotation of the pivot rod 20. The bushings 44 may include a metal wire mesh, a solid sleeve, or a combination of materials to provide a relatively low friction surface for rotation of the pivot rod 20. With respect to materials, the bushings 44 may include one or a combination of metal alloys, such as bronze and iron, ceramics, and composite materials, such as those containing carbon fibers and polymers. In additional embodiments, it is contemplated that the axle supports 42 may not include bushings or that the bushings may be integrally formed with the axle supports 42. It is also conceivable that the embossed indentations in other embodiments may be differently shaped and configured to be contained on more or less of the cover member 34 or the sidewall of the exhaust conduit 12.

Figure 3:
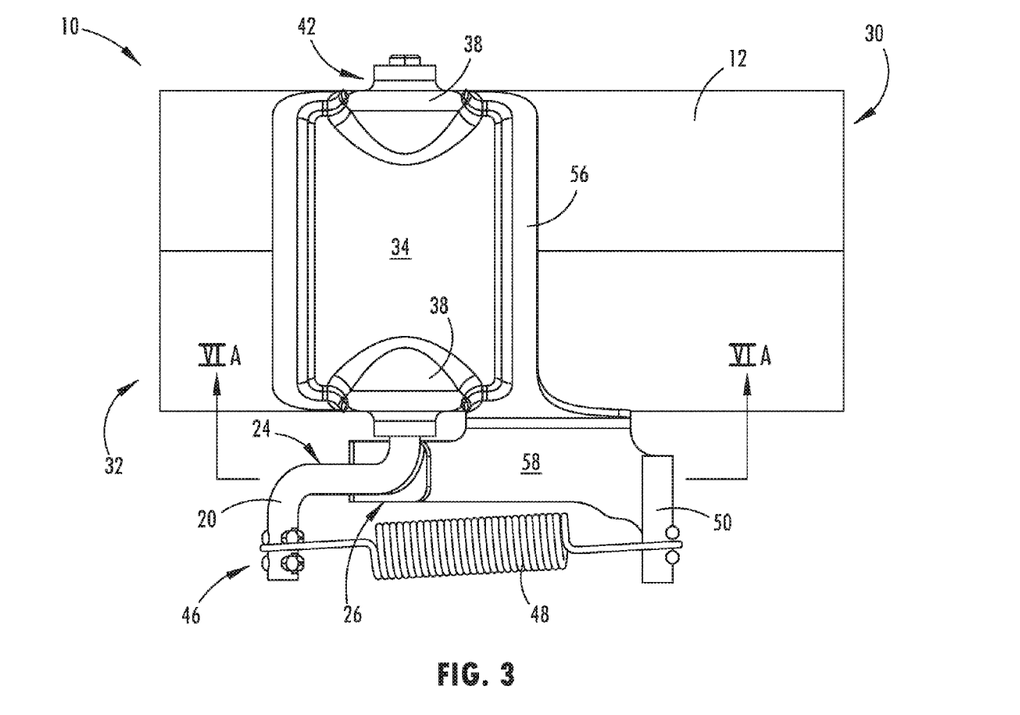
FIG. 3 is a top plan view of the exhaust valve assembly shown in FIG. 1.
Figure 4:
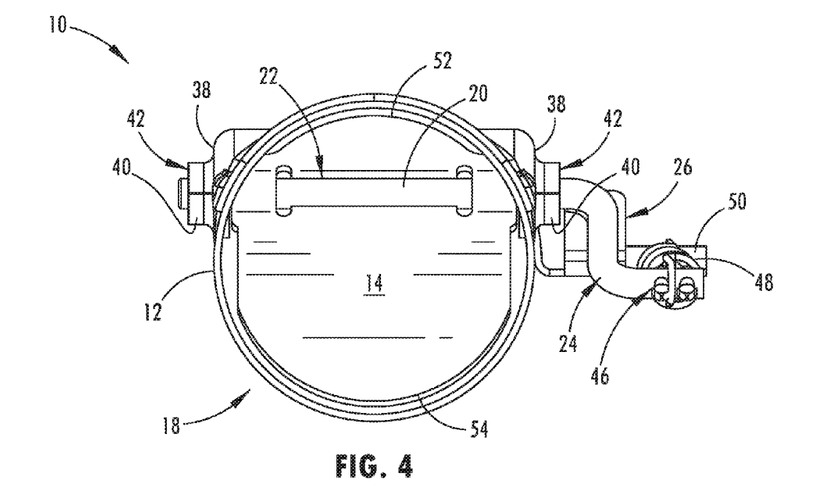
FIG. 4 is an end elevation view of the exhaust valve assembly shown in FIG. 1, having a valve plate in a closed position.

Referring now to FIGS. 3 and 4, the pivot rod 20 of the depicted embodiment has an internal section 22, or first section, that extends laterally through the exhaust conduit 12 to couple with the valve plate 14 and the axle supports 42. An external section 24, or second section, of the pivot rod 20 is show angling perpendicularly from one end of the internal section 22 of the pivot rod 20 and extending adjacent to the exterior surface of the exhaust conduit 12. A distal end portion 46 of the external section 24 angles perpendicularly in parallel alignment with the internal section 22 to define a spring attachment point. A tension spring 48 is thereby secured to the spring attachment point, which includes radial protrusions from the distal end portion 46 on opposing sides of the spring to prevent the spring from sliding laterally and disengaging from the spring attachment point on the spring arm. The external section 24 of the pivot rod 20 is thereby shown to have an L-shape formed with the distal end portion 46. It is contemplated, however, that the external section 24 of the pivot rod 20 may be alternatively shaped or angled, such as to provide a contact surface for the stop feature and/or a spring attachment point for attaching a tension spring.

As shown in FIG. 3, an opposing end of the tension spring 48 is attached at a spring anchor 50 that is fixed relative to the exhaust conduit 12, such that the tension spring 48 biases the external section 24 of the pivot rod 20 against the stop feature 26. The stop feature 26 protrudes outward from the exterior surface of the exhaust conduit 12 and is configured to abut the external section 24 of the pivot rod 20, defining the closed position 18 of the valve plate 14. The external section 24 of the pivot rod 20 is spring-biased against the stop feature 26 with the tension spring 48, thereby biasing the valve plate 14 in the closed position 18 in the embodiment shown in FIG. 3, which is described in greater detail herein.

Still referring to FIGS. 3 and 4, the internal section 22 of the pivot rod 20 spans across the internal volume of the exhaust conduit 12 in an orientation substantially orthogonal relative to the conduit axis and offset above the conduit axis. Opposing ends of the internal section 22 are pivotally coupled with the axle supports 42 on opposing sidewalls of the tubular conduit to provide rotational movement of pivot rod 20. An intermediate portion of the pivot rod 20, between the opposing ends of the internal section 22 is rigidly coupled with the valve plate 14, such that rotation of the pivot rod 20 operates the valve plate 14 between the open and closed positions 16, 18. The valve plate 14 thereby is pivotally coupled with a concave side of the cover member 34.

The illustrated embodiment of the valve plate 14, as shown in FIG. 4, includes upper and lower arcuate edges 52, 54 that substantially conform to the interior surface proximate the valve plate 14, which is defined by the curved shape of the cover member 34 and the curvature of the exhaust conduit 12, respectively. Between the arcuate edges 52, 54, the valve plate 14 includes linear edges substantially orthogonal to the internal section 22 of the pivot rod 20. Clearance areas are defined between the exhaust conduit 12 and the linear edges of the valve plate 14 to allow the valve plate 14 to pivot about the pivot rod 20 between the open and closed positions 16, 18. However, it is conceivable that the clearance areas may be eliminated or reduced by altering the shape of the exhaust conduit 12 proximate the valve plate 14 to conform the interior surface to the linear edges.

Figure 5:
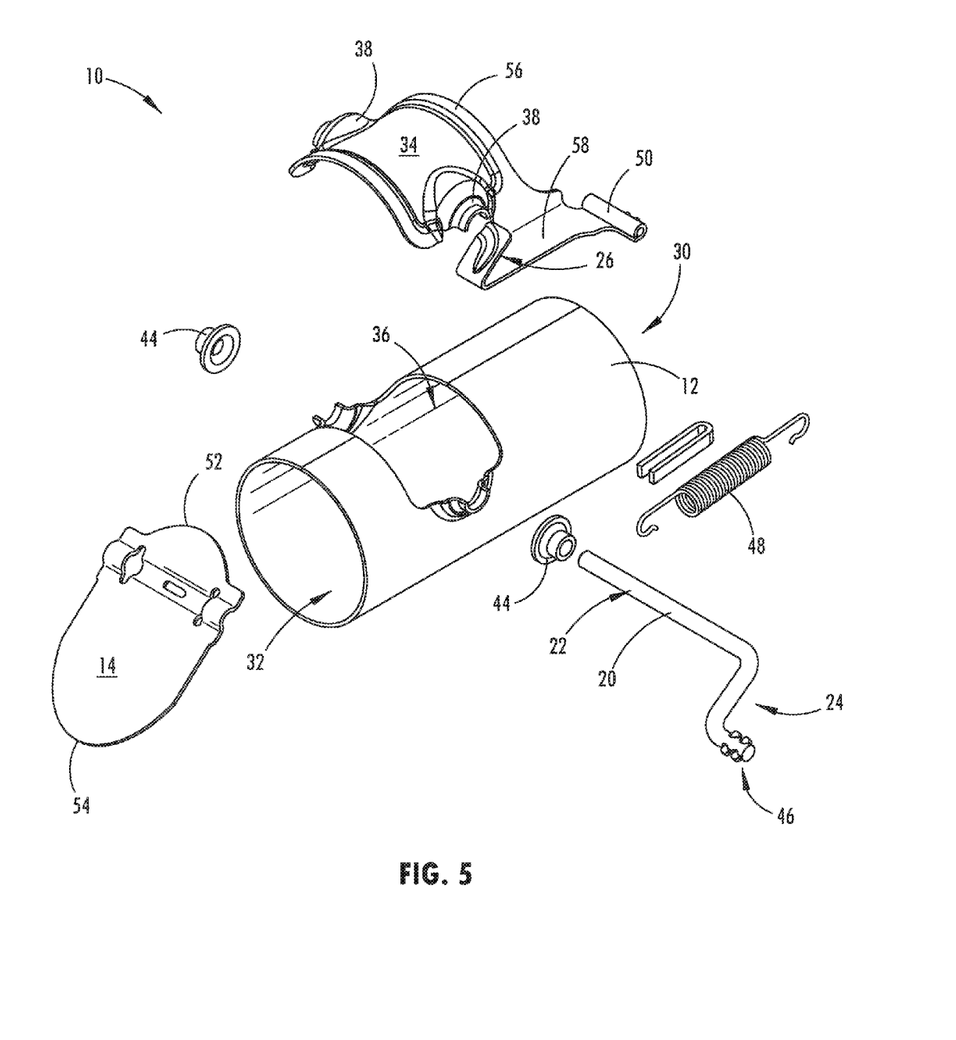
FIG. 5 is an exploded perspective view the exhaust valve assembly shown in FIG. 1.

As depicted in FIGS. 4 and 5, the valve plate 14 in the illustrated embodiment, proximate the upper arcuate edge 52 is provided with an attachment configuration for rigidly engaging the intermediate portion of the pivot rod 20. The illustrated embodiment of the attachment feature includes alternating curved bends in the valve plate 14 that each engage a side of the pivot rod 20. A central curved bend is provided with an aperture to weld or otherwise fixedly engage the pivot rod 20, such that valve plate 14 rotates in unison with rotation of the pivot rod 20. It is conceivable that the valve plate 14 or the pivot rod 20 in additional embodiments may have different attachment configurations or designs to provide a rigid connection between an upper portion of the valve plate 14 and the intermediate portion of the pivot rod 20.

With continued reference to the embodiment shown in FIGS. 4 and 5, the cover member 34 has a peripheral flange 56 that engages the edge of the aperture 36 in the sidewall of the exhaust conduit 12, which substantially conceals the aperture 36. As shown, a second flange 58 protrudes from the peripheral flange 56 on one lateral side of the cover member 34 proximate the external section 24 of the pivot rod 20. The stop feature 26 is disposed on a first end of the flange 58 and the spring anchor 50 disposed on an opposing second end of the flange 58. The spring anchor 50 is formed by rolling the second end of the flange 58. The stop feature 26 includes a tab that angles rearward to abut the external section 24 of the pivot rod 20 with the valve plate 14 in the closed position 18. As such, the stop feature 26 in the depicted embodiment is an integral piece of the cover member 34. A longitudinal extent of the tab spans from a first location adjacent to a pivotal axis of the internal section 22 of the pivot rod 20 to a second location adjacent to the external section 24 of the pivot rod 20. The tab is configured to abut the external section 24 of the pivot along the longitudinal extent of the tab for reducing noise associated with the valve plate 14 moving to the closed position 18.

Figure 8:
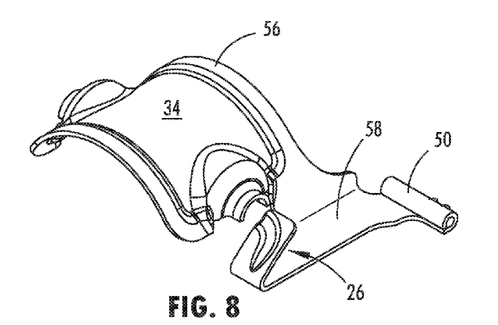
FIG. 8 is an upper perspective view of a cover member of the exhaust valve assembly, having one embodiment of a stop feature.
Figure 8A:
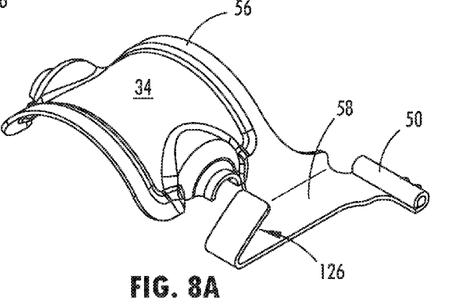
FIG. 8A is a top perspective view of an additional embodiment of a cover member of the exhaust valve assembly, having another embodiment of a stop feature.
Figure 8B:
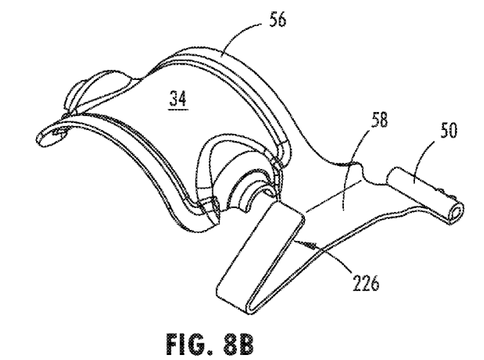
FIG. 8B is a top perspective view of an additional embodiment of a cover member of the exhaust valve assembly, having another embodiment of a stop feature.
Figure 8C:
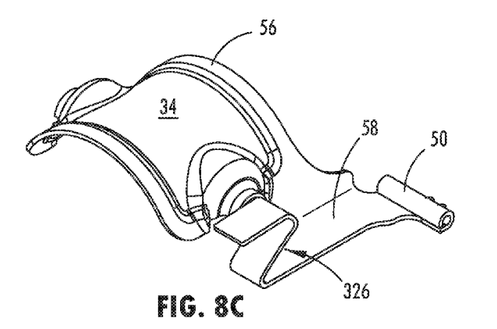
FIG. 8C is a top perspective view of an additional embodiment of a cover member of the exhaust valve assembly, having yet another embodiment of a stop feature.

Additional embodiments of the stop feature 26 are illustrated in FIGS. 8-8C. In the embodiment shown in FIG. 8, the tab of the stop feature 26 includes an indented channel, also referred to as a bead, which is configured to increase the surface area of the tab that contacts the pivot rod 20. Specifically, the indented channel includes a curved surface that substantially corresponds with the exterior surface of the external section 24 of the pivot rod 20. Also, in the embodiment shown in FIG. 8A, the tab 126 has a substantially planar upper surface for abutting the pivot rod 20. Moreover, in the embodiment shown in FIG. 8B, the tab 226 is elongated and the secondary flange 58 proximate the tab is bent downward to align the upper edge of the tab 226 with an exterior surface of the internal section 22 of the pivot rod 20, thereby further increasing the surface are of the tab 226 that contacts the pivot rod 20 in the closed position 18. Further, in the embodiment shown in FIG. 8C, the tab 326 is has an upper portion arranged to contact the pivot rod 20 when the valve plate pivots toward one or both of the open and closed positions to prevent further rotation of the pivot rod beyond the respective open or closed position. In the embodiments, the stop feature may be configured to resiliently flex upon contact with the pivot rod as the valve plate moves toward the open or closed position, thereby effectively absorbing impact energy and reducing associated noise. It is contemplated that additional embodiments of the tab may include bead forms for strengthening and increasing rigidity of the stop feature, and further other embodiments of the stop feature may have additional protruding elements and may be formed with a multitude of different shapes and configurations for abutting the pivot rod to control the positioning of the valve plate.

Figure 6:
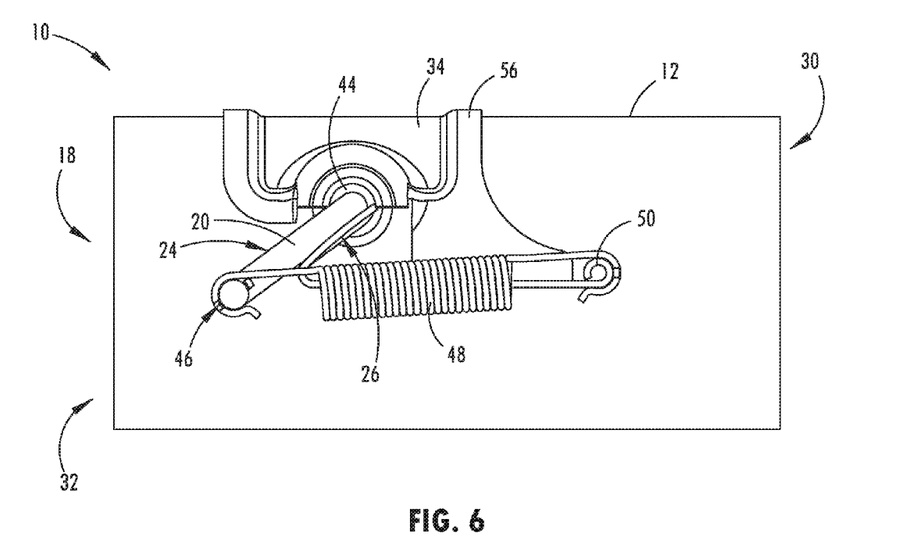
FIG. 6 is a side elevation view of the exhaust valve assembly shown in FIG. 1, having the valve plate in the closed position.
Figure 6A:
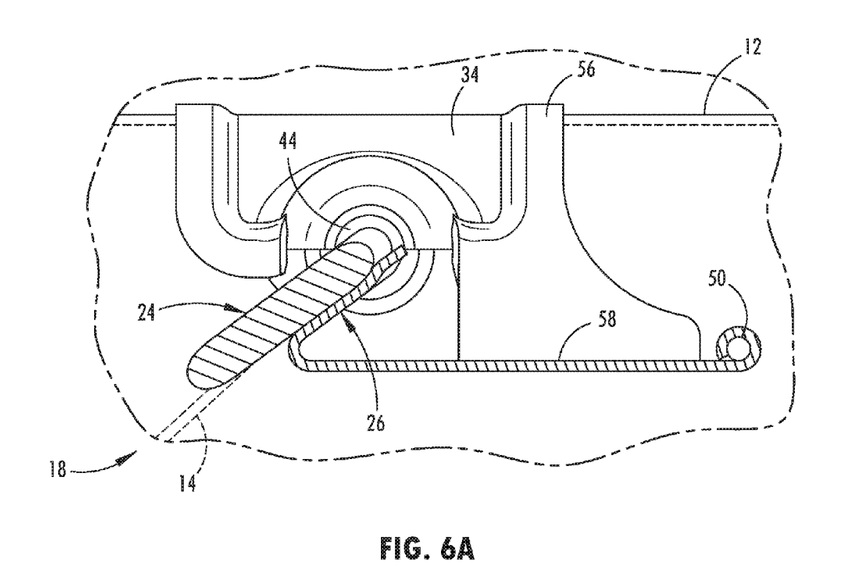
FIG. 6A is an enlarged cross-sectional view of a stop feature of the exhaust valve assembly, taken at line VIA-VIA of FIG. 3.

Referring now to FIGS. 6 and 6A, the tension spring 48 includes a coiled portion between the ends thereof that are coupled with the spring anchor 50 on the cover member 34 and the spring attachment point on the external portion of the pivot rod 20. As depicted in FIGS. 6 and 6A, the tension spring 48 has the valve plate 14 biased is in the closed position 18, such that the tension spring 48 extends in substantially parallel alignment with the center axis of the exhaust conduit 12. The valve plate 14 in the illustrated embodiment has a dimension between the upper and lower arcuate edges 52, 54 that is greater than the inside diameter of the exhaust conduit 12, such that the valve plate 14 is oriented an angle less than 90 degrees in the closed position 18. This orientation of the valve plate 14 prohibits it from rotating beyond the point at which the upper and/or lower arcuate edges 52, 54 abut the interior surface of the exhaust conduit 12. However, in the illustrated embodiment of the closed position 18, the upper and lower arcuate edges 52, 54 of the valve plate 14 are spaced from the interior surface of the exhaust conduit 12. This spacing is maintained by the stop feature 26 abutting the external section 24 of the pivot rod 20. The spacing also reduces clanking noise that may be generated by abutment between the valve plate 14 and the interior surface of the exhaust conduit 12.

Figure 7:
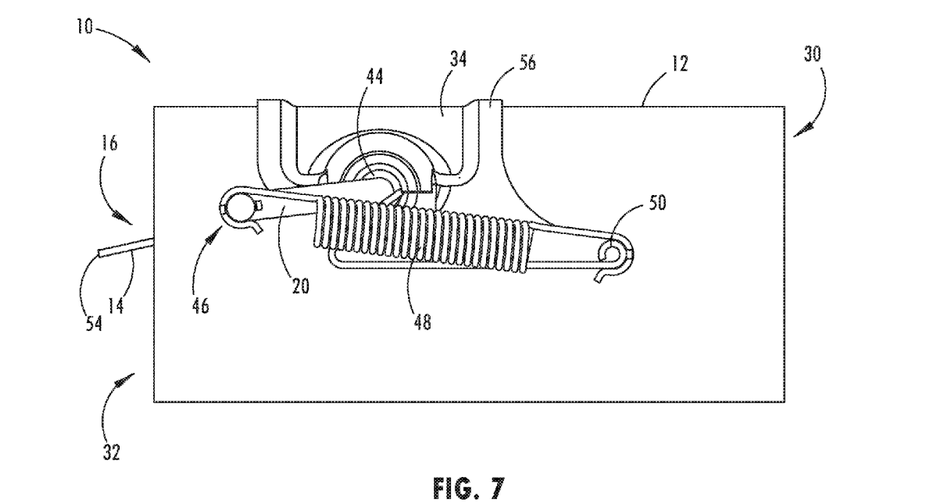
FIG. 7 is a side elevation view of the exhaust valve assembly shown in FIG. 1, having the valve plate in an open position.
Figure 7A:
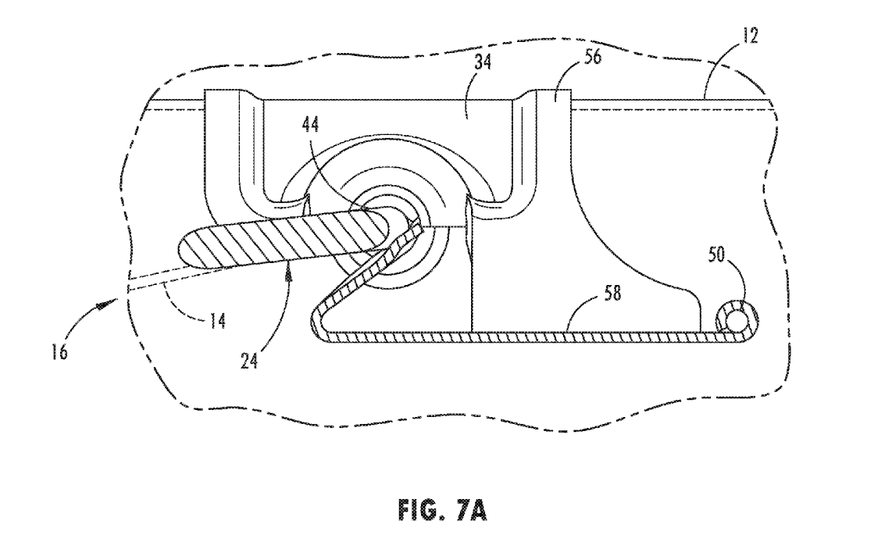
FIG. 7A is an enlarged cross-sectional view of the stop feature of the exhaust valve assembly, taken at line VIA-VIA of FIG. 3, showing the valve plate in the open position.

With reference to FIGS. 7 and 7A, when exhaust pressure from the inlet end 30 of the exhaust conduit 12 is sufficient to overcome the biasing force of the tension spring 48, the external section 24 of the pivot rod 20 rotates away from the stop feature 26 and pivots the valve plate 14 in the internal volume toward the open position 16. The biasing force of the tension spring 48 may increase as the valve plate 14 opens and the tension spring 48 stretches. The exhaust pressure from the inlet end 30 of the exhaust conduit 12 may likewise be released as the valve plate 14 opens. As such, in operation, it is contemplated that the passive valve assembly may be coupled with a muffler having a through pipe coupled with the outlet end 32 of the exhaust conduit 12 and a passage extending to at least one muffler chamber upstream from the inlet opening. In such an arrangement, with the valve plate 14 in the closed position 18 (FIGS. 6 and 6A), the exhaust gases will be restricted from passing through the valve assembly and urged to enter the at least one muffler chamber before exiting the muffler. When the exhaust pressure exceeds a threshold corresponding with the biasing force of the tension spring 48, the valve plate 14 may pivot to the open position 16 to release the pressure by allowing the exhaust to exit the muffler via the through pipe, avoiding the at least one muffler chamber.

The method of forming a passive exhaust valve according to one embodiment is generally illustrated in a series of steps shown FIGS. 9A-10F. Initially, to provide the exhaust conduit 12, with the aperture 36 in the sidewall and the lower embossed indentations 40 of the previously illustrated embodiment, some exemplary forming steps are shown in FIGS. 9A-9D. At the step shown in FIG. 9A, a sheet material 60 is provided that has cutouts stamped on opposing edges of the sheet. It is contemplated that the cutouts may alternatively be combined and stamped centrally on the sheet 60 to form the aperture 36. To form a tubular-shaped exhaust conduit 12 with the stamped sheet material 60, as shown in FIG. 9B, the sheet material 60 is formed around a cylinder shape to substantially engage the opposing edges in abutting contact. To assist with maintaining the cylindrical shape of the exhaust conduit 12, a central mandrel may be used where the cylindrical shape is shown in dashed lines in FIG. 9B. In another embodiment, the tubular shape of the exhaust conduit may also be done by roll forming the sheet material 60 or by other known processing to form a section of exhaust pipe. As shown in FIG. 9C, the opposing edges are attached, such as by welding, a lock seam, and other means, with the cutouts aligned to define an aperture 36 in a sidewall of the tubular conduit. Again, in another embodiment, the cutouts may be combined and stamped in a central portion of the sheet material 60 to avoid alignment issues. It is also conceivable that in additional embodiments, tubular conduit may be formed without stampings or cutout sections as a standard piece of pipe cut to length, and then the aperture may be cut or otherwise punched from the sidewall of the tubular conduit, with known means for exhaust pipe cutting and trimming.

Figure 9A:
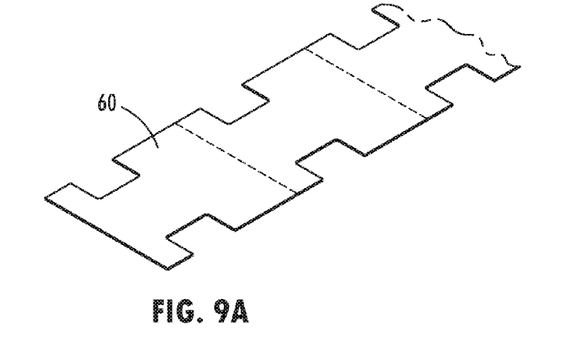
FIGS. 9A-9D illustrate successive steps of forming of a conduit with a sidewall aperture for an exhaust valve assembly, according to one exemplary embodiment.
Figure 9B:
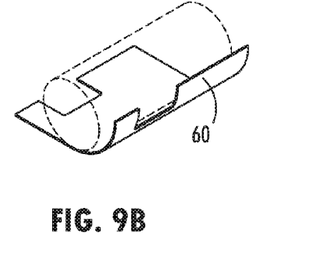
Figure 9C:
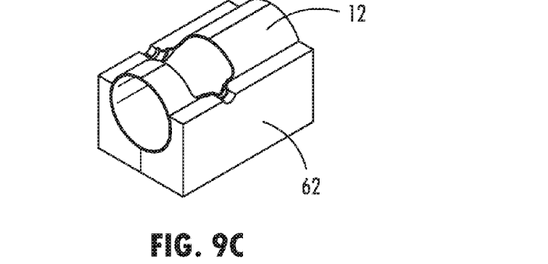
Figure 9D:
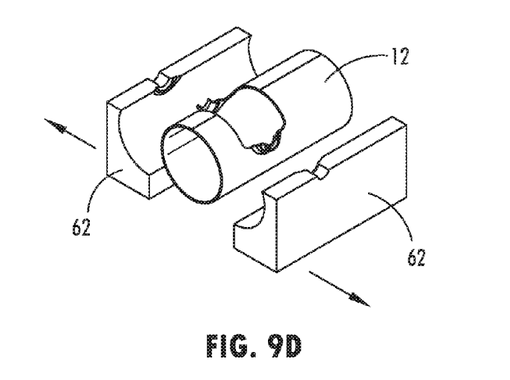

To form the lower embossed indentations 40 in the opposing lateral edges of the aperture 36, a support structure may be formed around the exhaust conduit 12, as shown in FIG. 9C, whereby a cradle 62, or external mandrel, may engage the exterior surface of the exhaust conduit 12. A press or cam action inserts or the like may be urged against the opposing lateral edges of the aperture to form the lower embossed indentations 40 of the axle supports 42. Upon forming the lower embossed indentations 40, the blank 64 and cradle 62 may be removed as shown in FIG. 9D. It is contemplated that the lower embossed indentations in other embodiments may be formed prior to or simultaneously with the sheet material being formed in the tubular shape, such as shown in FIGS. 9A and 9B. The steps illustrated in FIGS. 9A-9D may be done in a different sequence from that illustrated and may be accomplished with alternative methods of stamping, cutting, forming, and joining, as generally understood by one having ordinary skill in the art.

Figure 10A:
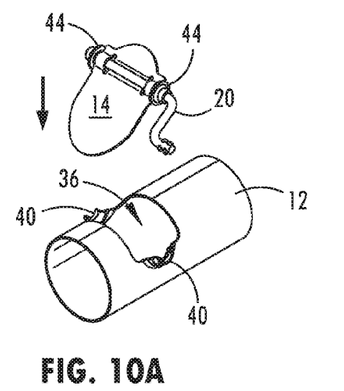
FIGS. 10A-10F illustrate successive steps of installing or assembling an exhaust valve within the exhaust conduit shown in FIG. 9D, according to one exemplary embodiment.
Figure 10B:
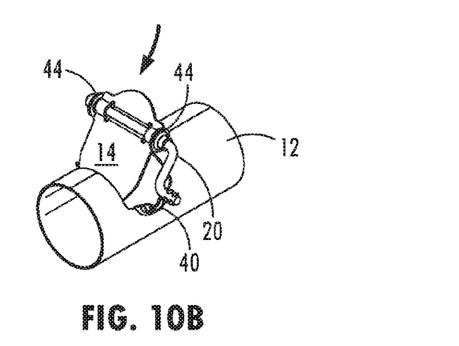
Figure 10C:
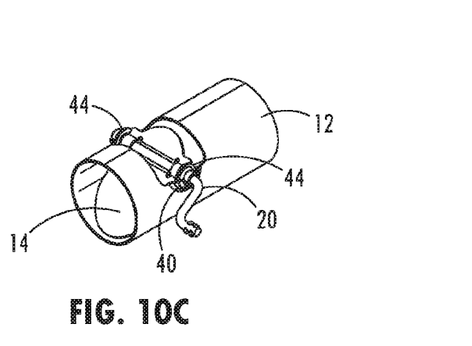
Figure 10D:
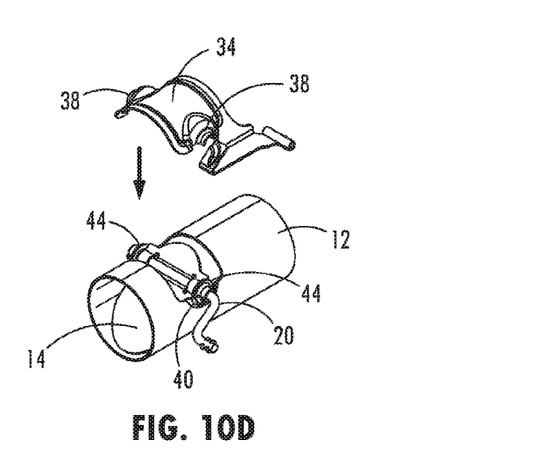
Figure 10E:
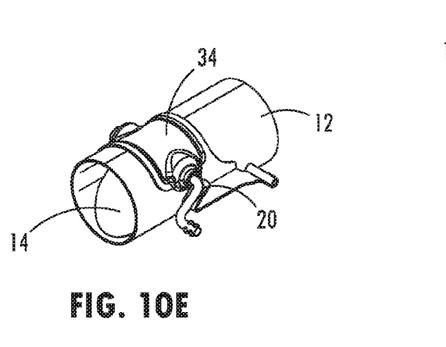
Figure 10F:
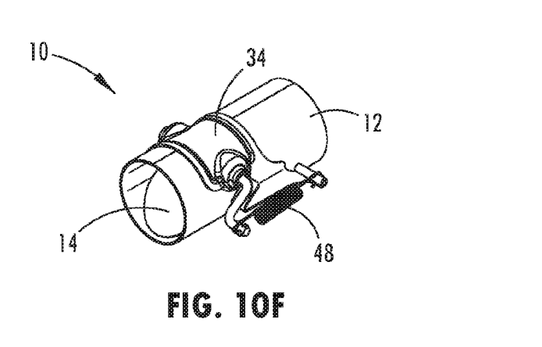

Referring now to the assembly steps of the method of forming a passive exhaust valve shown in FIGS. 10A-10F, the exhaust conduit 12 is provided with the sidewall aperture 36 and the lower embossed indentations 40. The pivot rod 20 is also provided with bushings 44, which may be press fit or otherwise secured to the pivot rod 20, and the valve plate 14 fixedly coupled with the internal or intermediate portion of the pivot rod 20. As shown in FIG. 10A, the pivot rod 20 and valve plate 14 are together aligned above the sidewall aperture 36 of the exhaust conduit 12. The valve plate 14 is then inserted at an angle into the internal volume of the exhaust conduit 12, as shown in FIG. 10B. The pivot rod 20 is then engaged with the lower embossed indentations 40, as shown in FIG. 10C, whereby the bushings 44 are seated in the lower embossed indentations 40 or saddle areas. The cover member 34 is then provided, as shown in FIGS. 10D and 10E, and joined at the periphery of the cover member 34 around the aperture 36 to conceal the aperture 36 and engage the upper embossed indentations 38 with the lower embossed indentations 40 to form the axle supports 42. Further, as shown in FIG. 10F, the method includes attaching a tension spring 48 between the spring anchor 50 on the flange 58 and an external section 24 of the pivot rod 20, whereby the tension spring 48 biases the valve plate 14 in a closed position 18. Again, it is conceivable that these steps may be done in a different sequence from that illustrated and may be accomplished with alternative methods of attaching, assembling, stamping, cutting, forming, and joining, as generally understood by one having ordinary skill in the art.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

It will be understood by one having ordinary skill in the art that the specific devices and processes illustrated in the attached drawings and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise. It will also be understood that construction of the described invention and other components is not limited to any specific material. Other exemplary embodiments of the invention disclosed herein may be formed from a wide variety of materials, unless described otherwise herein.

For purposes of this disclosure, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. Also, for purposes of this disclosure, the term "coupled" (in all of its forms, couple, coupling, coupled, etc.) generally means the joining of two components (electrical or mechanical) directly or indirectly to one another. Such joining may be stationary in nature or movable in nature; may be achieved with the two components (electrical or mechanical) and any additional intermediate members being integrally formed as a single unitary body with one another or with the two components; and may be permanent in nature or may be removable or releasable in nature, unless otherwise stated.

Changes and modifications in the specifically-described embodiments may be carried out without departing from the principles of the present invention, which is intended to be limited only by the scope of the appended claims as interpreted according to the principles of patent law including the doctrine of equivalents.

What is claimed is:

1. A passive exhaust valve assembly, comprising:
a conduit for transporting exhaust gases;
a pivot rod extending through a wall of the conduit to define an internal section and an external section of the pivot rod;
a valve plate disposed in the conduit and coupled with the internal section of the pivot rod, the pivot rod rotatable to move the valve plate between open and closed positions; and
a cover member disposed at a wall of the conduit to substantially conceal an aperture in the wall of the conduit, wherein the cover member comprises a flange protruding outward from the conduit, and wherein the flange comprises a stop feature arranged to contact the external section of the pivot rod when the valve plate pivots toward at least one of the open and closed positions to prevent further rotation of the pivot rod beyond the respective open or closed position.

2. The passive exhaust valve assembly of claim 1, wherein the stop feature is configured to resiliently flex upon contact with the pivot rod as the valve plate moves toward the open or closed position, thereby effectively reducing noise.

3. The passive exhaust valve assembly of claim 1, wherein the pivot rod spans across an internal volume of the conduit and pivotally engages an opposing wall of the conduit.

4. The passive exhaust valve assembly of claim 1, wherein the stop feature of the flange includes a tab portion angled relative to the wall of the conduit.

5. The passive exhaust valve assembly of claim 4, wherein the stop feature is an integral portion of the cover member.

6. The passive exhaust valve assembly of claim 4, wherein the cover member includes a spring anchor adapted for engaging a tension spring that spans between the cover member and the external section of the pivot rod and biases the valve plate in the closed position.

7. The passive exhaust valve assembly of claim 1, wherein the flange of the cover member includes a spring anchor, and wherein the spring anchor is adapted for engaging a tension spring that attaches between the cover member and the external section of the pivot rod for biasing the valve plate in the closed position.

8. A passive valve assembly for an engine exhaust system, said passive valve assembly comprising:
an exhaust conduit for transferring exhaust gases from the engine;
a valve plate operably disposed within the exhaust conduit and pivotable between an open position and a closed position;
a pivot rod having an internal section coupled with the valve plate and an external section protruding from the exhaust conduit; and
a stop feature disposed at or near an exterior surface of the exhaust conduit and having a tab portion angled relative to the exterior surface of the exhaust conduit, wherein the tab portion is arranged to contact the external section of the pivot rod and prevent the valve plate from pivoting beyond one of the open position and the closed position, and wherein the tab portion is configured to resiliently flex relative to the exhaust conduit upon initial contact with the external section of the pivot rod as the valve plate is pivoting toward the open position or the closed position.

9. The passive exhaust valve assembly of claim 8, wherein the tab portion is an integral piece of a cover member attached at the exterior surface of the exhaust conduit and spanning over an aperture in a sidewall of the exhaust conduit.

10. The passive exhaust valve assembly of claim 8, further comprising:
a spring coupled between the external section of the pivot rod and the exhaust conduit to bias the valve plate in the closed position.

11. The passive exhaust valve assembly of claim 8, wherein the pivot rod is coupled with a pair of bushings disposed at opposing walls of the exhaust conduit.

12. The passive exhaust valve assembly of claim 8, wherein the external section of the pivot rod includes an end portion that is angled from a rotational axis of the internal section to contact the stop feature and thereby reduce noise associated with the valve plate moving to the open or closed position.

13. The passive exhaust valve assembly of claim 8, further comprising:
a cover member coupled with the exhaust conduit about an aperture in a sidewall of the exhaust conduit to substantially conceal the aperture, the cover member having a curved shape substantially aligned with a curvature of the exhaust conduit.

14. The passive exhaust valve assembly of claim 13, wherein the stop feature is disposed at the cover member and protrudes away from the exhaust conduit, and wherein the valve plate is disposed at or near a concave side of the cover member.

15. The passive exhaust valve assembly of claim 13, wherein the exhaust conduit includes a pair of axle supports for engaging bushings on opposing sides of the exhaust conduit, and wherein the pivot rod rotatably engages the bushings.

16. A method of forming a passive exhaust valve, comprising:
providing a first circumferential portion of a tubular conduit having a saddle area disposed on at least one lateral edge of the first circumferential portion;
engaging a pivot rod at the saddle area to locate a valve plate in an interior of the tubular conduit, wherein the valve plate is coupled with an internal section of the pivot rod, such that rotation of the pivot rod moves the valve plate between open and closed positions;
aligning a second circumferential portion with the lateral edges of the first circumferential portion to form the tubular conduit around the valve plate;
welding the first and second circumferential portions together;
wherein the second circumferential portion includes a cover member that is sized to substantially conceal an aperture in a wall of the second circumferential portion to form the tubular conduit; and
wherein the cover member includes a flange that protrudes outward to form a stop feature arranged to contact an external section of the pivot rod and prevent rotation of the pivot rod when the valve plate assumes one of the open position and the closed position.

17. The method of claim 16, wherein the cover member includes a stop feature that is arranged to contact an external section of the pivot rod when the valve plate pivots toward at least one of the open position and the closed position to prevent further rotation of the pivot rod beyond the respective open or closed position.

18. The method of claim 16, wherein the cover member includes a spring anchor for attaching a tension spring that spans between the spring anchor and the external section of the pivot rod, whereby the tension spring biases the valve plate in a closed position.

19. The method of claim 16, further comprising:
engaging a bushing between the saddle area and the pivot rod for rotatably supporting the pivot rod.

20. The method of claim 16, wherein an external section of the pivot rod includes an end portion that is angled from a rotational axis of the internal section, the end portion configured to contact the stop feature when the valve plate moves toward the open or closed position.

21. A passive exhaust valve assembly for an engine exhaust system, said passive valve assembly comprising:
an exhaust conduit for transporting exhaust gases;
a valve plate operably disposed within the exhaust conduit and pivotable between an open position and a closed position;
a pivot rod engaging an axle support at least partially disposed at a wall of the exhaust conduit, wherein the pivot rod includes an internal section coupled with the valve plate and an external section protruding from the exhaust conduit;
a spring anchor disposed at or near an exterior portion of the exhaust conduit for engaging a spring that extends to the external section of the pivot rod to bias the valve plate in the closed position;
a stop feature disposed at or near the exterior portion of the exhaust conduit and arranged to contact the external section of the pivot rod when the valve plate pivots toward at least one of the open and closed positions to limit rotation of the pivot rod; and
a cover member attached at the wall of the exhaust conduit to substantially conceal an aperture in the wall of the conduit, wherein the cover member includes an integral flange having a portion protruding from the wall of the exhaust conduit and comprising at least one of the stop feature, the spring anchor, and a portion of the axle support.

22. The passive exhaust valve assembly of claim 21, wherein the pivot rod is coupled with a bushing disposed at the axle support on the exhaust conduit.

23. The passive exhaust valve assembly of claim 21, wherein the external section of the pivot rod includes an end portion that is angled from a rotational axis of the internal section, and wherein the end portion is arranged to contact the stop feature.

24. The passive exhaust valve assembly of claim 21, wherein the cover member includes a curved shape substantially aligned with a curvature of the wall of exhaust conduit.

25. The passive exhaust valve assembly of claim 21, wherein the stop feature is disposed at the integral flange of the cover member.

26. The passive exhaust valve assembly of claim 21, wherein the integral flange of the cover member includes the stop feature and the spring anchor.

27. The passive exhaust valve assembly of claim 21, wherein the axle support is provided at a seam between the cover member and the wall of the exhaust conduit.

28. The passive exhaust valve assembly of claim 21, wherein the exhaust conduit includes a pair of axle supports that engage bushings on opposing sides of the exhaust conduit, and wherein the pivot rod rotatably engages the bushings.

* * * * *

UNITED STATES PATENT AND TRADEMARK OFFICE
CERTIFICATE OF CORRECTION

PATENT NO. : 9,464,559 B2
APPLICATION NO. : 15/015299
DATED : October 11, 2016
INVENTOR(S) : Robert Leroy Middleton, Jr. et al.

Page 1 of 1

It is certified that error appears in the above-identified patent and that said Letters Patent is hereby corrected as shown below:

On the Title Page (72) Inventors:
"Robert Leroy Middleton, Jr., Middleville, MI (US); Justin Tyler Middleton, Middleville, MI (US)"

Should be:
--Robert Leroy Middleton, Jr., Middleville, MI (US); Justin Tyler Middleton, Middleville, MI (US); Bradley Blair Walworth, Jackson, MI (US)--

Signed and Sealed this
Sixth Day of August, 2019

Andrei Iancu
*Director of the United States Patent and Trademark Office*